United States Patent [19]

Natarajan

[11] Patent Number: 4,887,207
[45] Date of Patent: Dec. 12, 1989

[54] AUTOMATED SYSTEM FOR EVALUATING THE SENSITIVITY OF INVENTORY COSTS DUE TO FLUCTUATIONS IN CUSTOMER DEMAND

[75] Inventor: Bharath Natarajan, Marietta, Ga.

[73] Assignee: International Business Machines Corporation, Armonk, N.Y.

[21] Appl. No.: 138,781

[22] Filed: Dec. 29, 1987

[51] Int. Cl.$^4$ .............................................. G06F 15/21
[52] U.S. Cl. .................................... 364/401; 364/468; 364/300
[58] Field of Search ............... 364/403, 401, 468, 300; 235/385

[56] References Cited

U.S. PATENT DOCUMENTS 4,383,298  5/1983  Huff et al. ...................... 364/403 X
4,646,238  2/1987  Carlson, Jr. et al. ............... 364/403

OTHER PUBLICATIONS

Jonsson, H. et al. "Impact of Processing and Queueing Times on Order Quantities", *Mater. Flow*, vol. 2, No. 4, Aug. 1985, 221 230.
Gutzmann, K. M. et al. "Capacity Control Policies for MRP Systems", *Int. J. Prod. Res.*, vol. 24, No. 2, Mar.-Apr. 1986, 359–374.
Watson, R. B. "The Effects of Demand–Forecast Fluctuations on Customer Service and Inventory Cost When Demand is Lumby", *J. Oper. Res. Soc.*, vol. 38, No. 1, Jan. 1987, 75–82.
DiBiase, D. et al. "The Inventory Simulator: A Microcomputer-Based Inventory Model", *SCS*, Jan. 1987, 104–106.
Bagshaw, E. "The Critical Path to Completion (Project Planning)", *Prof. Comput. (Australia)*, No. 10, Feb. 1986, 6–8.
Kukla, D. E. "Spreadsheets in Manufacturing", *Manuf. Syst.*, vol. 3, No. 1, Jan. 1985, 54–55.
Grubbstron, R. et al. "Evaluation of Payment Consequences from the Control and Design of Production Systems", *Eng. Costs Prod. Econ.*, vol. 5, No. 3, 1981, 265–272.
Bertrand, J. et al. "Multiproduct Optimal Batch Sizes with In-Process Inventories and Multi Work Centers", *IIE Trans.*, vol. 17, No. 2, Jun. 1985, 157–163.
Boe, W. J. et al. "Dependent Demand Safety Stocks", 10th Annual Conference of the American Institute for Decision Sciences, St. Louis, MO, Oct. 30–Nov. 1, 1978, Pt. II, 318.
Johnson, I. "Decision Support Helps Manage Flexible Manufacturing Systems", *Electronics (U.S.A.)*, vol. 56, No. 21, Oct. 1983, 123–125.

*Primary Examiner*—Clark A. Jablon
*Attorney, Agent, or Firm*—Whitham & Marhoefer

[57] ABSTRACT

An automated inventory management system is provided which is easy to use and user friendly to evaluate the impact of customer demand changes on inventory. For a given item, the system automatically defines an inventory model by accessing an engineering planning database. The system identifies the on-hand raw material inventory and evaluates the work-in-process inventory from the model. The system then accesses an inventory database to identify the finished goods inventory and automatically consolidates all inventory and computes the total impact. The system also provides the practicing manager necessary control limits on raw material and work-in-process inventory dollars to complete a given finished product and establishes the required inventory turns. The user can use the system to compare against acutals and take appropriate action to correct any process deficiencies. This provides the capability to evaluate inventory sensitivity to customer demand and can be used to better serve the customer and his needs.

6 Claims, 5 Drawing Sheets

SUMMARY COST VALUES

| TIME PERIOD: | 1 | 2 | 3 | 4 |
|---|---|---|---|---|
| PLANNED DEMAND: | $x_1$ | $x_2$ | $x_3$ | $x_4$ |
| REVISED DEMAND: | $y_1$ | $y_2$ | $y_3$ | $y_4$ |
| MATERIAL COST AS PLANNED: | $m_1$ | $m_2$ | $m_3$ | $m_4$ |
| MATERIAL COST BASED ON REVISED DEMAND: | $m'_1$ | $m'_2$ | $m'_3$ | $m'_4$ |
| Δ VARIATION: | $(m'_1-m_1)$ | $(m'_2-m_2)$ | $(m'_3-m_3)$ | $(m'_4-m_4)$ |
| WIP INVENTORY COST AS PER ORIGINAL PLAN: | $w_1$ | $w_2$ | $w_3$ | $w_4$ |
| WIP INVENTORY COST AS PER REVISED PLAN: | $w'_1$ | $w'_2$ | $w'_3$ | $w'_4$ |
| Δ VARIATION: | $(w'_1-w_1)$ | $(w'_2-w_2)$ | $(w'_3-w_3)$ | $(w'_4-w_4)$ |
| FINISED GOODS: | $f_1$ | $f_2$ | $f_3$ | $f_4$ |
| TOTAL INVENTORY IMPACT: | $T_1$ | $T_2$ | $T_3$ | $T_4$ |

| INVENTORY MODEL FOR P/N : #1  STD=1350.92 SUM=1 | | | | | | | | | | | | |
|---|---|---|---|---|---|---|---|---|---|---|---|---|
| PERIOD | 12 | 11 | 10 | 9 | 8 | 7 | 6 | 5 | 4 | 3 | 2 | 1 |
| P/N #1 | ASSEMBLY 1 | 0 | 0 | 0 | 0 | 0 | 0 | 0 | 0 | 0 | 0 | 1 | 0 |
| P/N #1,A | ASSY 1,1 | 0 | 0 | 0 | 0 | 0 | 0 | 0 | 0 | 0 | 0 | 1 | 0 |
| P/N #1,B | ASSY 1,2 | 0 | 0 | 0 | 0 | 0 | 0 | 0 | 413 | 0 | 0 | 28 | 0 |
| P/N #1,C | ASSY 1,3 | 0 | 0 | 113 | 0 | 0 | 0 | 254 | 0 | 0 | 7 | 28 | 0 |
| P/N #1,D | ASSY 1,4 | 0 | 0 | 188 | 0 | 0 | 5 | 10 | 10 | 16 | 16 | 7 | 0 |
| P/N #1,E | ASSY 1,5 | 0 | 0 | 143 | 0 | 0 | 2 | 2 | 0 | 0 | 0 | 0 | 0 |
| | | 0 | 0 | 143 | 0 | 0 | 5 | 10 | 15 | 33 | 33 | 0 | 0 |

INVENTORY MODEL FOR P/N : #1  STD=1350.92  SUM=1350.93  P/L:1

| | PERIOD | 12 | 11 | 10 | 9 | 8 | 7 | 6 | 5 | 4 | 3 | 2 | 1 | 0 |
|---|---|---|---|---|---|---|---|---|---|---|---|---|---|---|
| P/N #1 | ASSEMBLY 1 | 0 | 0 | 0 | 0 | 0 | 0 | 0 | 0 | 0 | 0 | 1 | 0 | 1 |
| P/N #1,A | ASSY 1,1 | 0 | 0 | 0 | 0 | 0 | 0 | 0 | 413 | 0 | 0 | 28 | 28 | 0 |
| P/N #1,B | ASSY 1,2 | 0 | 0 | 0 | 0 | 0 | 0 | 254 | 0 | 0 | 7 | 7 | 7 | 0 |
| P/N #1,C | ASSY 1,3 | 0 | 0 | 113 | 0 | 0 | 5 | 10 | 10 | 16 | 16 | 0 | 0 | 0 |
| P/N #1,D | ASSY 1,4 | 0 | 0 | 188 | 0 | 0 | 2 | 2 | 0 | 0 | 0 | 0 | 0 | 0 |
| P/N #1,E | ASSY 1,5 | 0 | 0 | 143 | 0 | 0 | 5 | 10 | 15 | 33 | 33 | 0 | 0 | 0 |
| | MATERIAL COST | 0 | 0 | 449 | 0 | 0 | 0 | 254 | 418 | 0 | 0 | 1 | 0 | 0 |
| | LABOR AND OVERHEAD | 0 | 0 | 0 | 0 | 0 | 12 | 22 | 25 | 49 | 56 | 35 | 34 | 1 |
| | TOTAL | 0 | 0 | 449 | 0 | 0 | 12 | 276 | 436 | 49 | 56 | 36 | 34 | 1 |
| | TOTAL WIP | 0 | 0 | 0 | 0 | 0 | 461 | 22 | 25 | 49 | 310 | 448 | 84 | 2 |
| | CUMULATIVE WIP | 0 | 0 | 0 | 0 | 0 | 461 | 488 | 508 | 557 | 867 | 1815 | 1343 | 1354 |
| | WIP % OF STANDARD | 0 | 0 | 0 | 0 | 0 | 34 | 36 | 38 | 41 | 64 | 97 | 100 | 100 |
| | TOTAL % OF STANDARD | 0 | 0 | 33 | 0 | 0 | 1 | 20 | 32 | 4 | 4 | 3 | 3 | 3 |

```
100%                                          ***************
 90%                                    ***************************
 80%                                    ****************************
 70%                                    ***************************
 60%                                    **************************
 50%                              *********************************
 40%                              **********************************
 30%            **********************************************************
 20%            ************************************************************
 10%            ***********************************************************
  0% ***********************************************************************
```

TOT. CUM-
ULATIVE%  0    0   33   33   33   34   55   87   91   95   97  100  100

MONTHS OF INVENTORY
FROM MODEL :  1.75 → [ (.33x11)+(.01x8)+(.2x7)+(.32x6)+(.04x5)
                       (.04x4)+(.03x3)+(.03x2) ]

INV TURNS (IDEAL)
FROM MODEL:  6.36 → [YEARLY OUTPUT MLO DOLLARS] ÷ [(MOS. OF INV)x(STD COST)x(AV MO.DMD)]

FIG. 3

SUMMARY COST VALUES

| TIME PERIOD: | 1 | 2 | 3 | 4 | ..... |
|---|---|---|---|---|---|
| PLANNED DEMAND: | $x_1$ | $x_2$ | $x_3$ | $x_4$ | ..... |
| REVISED DEMAND: | $y_1$ | $y_2$ | $y_3$ | $y_4$ | ..... |
| MATERIAL COST AS PLANNED: | $m_1$ | $m_2$ | $m_3$ | $m_4$ | ..... |
| MATERIAL COST BASED ON REVISED DEMAND: | $m'_1$ | $m'_2$ | $m'_3$ | $m'_4$ | ..... |
| Δ VARIATION: | $(m'_1-m_1)$ | $(m'_2-m_2)$ | $(m'_3-m_3)$ | $(m'_4-m_4)$ | ..... |
| WIP INVENTORY COST AS PER ORIGINAL PLAN: | $w_1$ | $w_2$ | $w_3$ | $w_4$ | ..... |
| WIP INVENTORY COST AS PER REVISED PLAN: | $w'_1$ | $w'_2$ | $w'_3$ | $w'_4$ | ..... |
| Δ VARIATION: | $(w'_1-w_1)$ | $(w'_2-w_2)$ | $(w'_3-w_3)$ | $(w'_4-w_4)$ | ..... |
| FINISED GOODS: | $f_1$ | $f_2$ | $f_3$ | $f_4$ | ..... |
| TOTAL INVENTORY IMPACT: | $T_1$ | $T_2$ | $T_3$ | $T_4$ | ..... |

*FIG. 4*

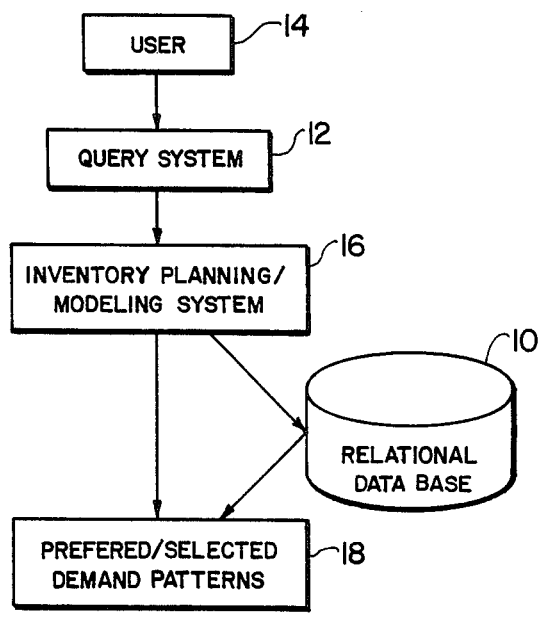

*FIG. 5*

AUTOMATED SYSTEM FOR EVALUATING THE SENSITIVITY OF INVENTORY COSTS DUE TO FLUCTUATIONS IN CUSTOMER DEMAND

CROSS-REFERENCE TO RELATED APPLICATIONS

The subject matter of this application relates to that of copending applications Ser. No. 07/100,395 filed Sept. 24, 1987, by Kate M. Ferriter and Robert B. Mathis for "Automated Bill of Materials" and Ser. No. 07/127,334 filed Dec. 1, 1987, by Bharath Natajaran for "Automated Production Release System", both of which are assigned to a common assignee with this application. The disclosures of these cross-referenced applications are incorporated herein by reference.

BACKGROUND OF THE INVENTION

1. Field of the Invention

The present invention generally relates to a computer based inventory evaluation system and, more particularly, to an inventory value estimation system which interfaces directly with a production planning system to provide an integrated approach to a manufacturing planning software design.

2. Description of the Prior Art

The process of designing, developing and manufacturing a new product, or making major changes to existing products, presents many challanges to product managers and manufacturing managers to bring a product to market for the least cost, within schedule while maintaining product quality. In today's highly competitive industries, product managers and manufacturing managers require information to address many problems that arise because of the complexity of new products and the complexity of world-wide production and the changing nature of competition. The requirement that products be manufactured for the least possible cost is important in all industries. Of all the costs associated with manufacturing a product, inventory cost is one of the primary factors, and all enterprises try to reduce this cost. Recent advances in manufacturing systems, utilizing proven Japanese techniques of production, try to plan the arrival of all components and materials "just-in-time" to manufacture is a prime example of efforts to reduce inventory cost.

A number of books and articles have been published that address the issue of inventory costs, notably the industry reference *Production-Inventory Systems, Planning and Control* by Elwood S. Buffa, published by Richard D. Irwin, Inc., Homewood, Ill., and *Analysis of Inventory Systems* by G. Hadley and T. M. Whitin, published by Prentice-Hall International, Inc., to name two. All systems to date refer to various types of rules for planning purposes in order to reduce inventory costs. When customers place demand for a product from a manufacturer, the planning department analyzes the demand and establishes inventory required to manufacture the product. That inventory, calculated through the bill of material, is the component inventory or raw material inventory. In general, components are assembled together through various stages of the manufacturing process to produce the finished product. All during the manufacturing process, labor and overhead costs are added to the raw material cost to calculate the total cost of the product. Customer demand for a product often changes over time, and customers frequently change the demand quantities and expect response from the manufacturer. In almost all planning systems, the impact of inventory costs (work-in-process inventory) is ignored while responding to changes in customer demand as it is often difficult to establish the work-in-process inventory cost impact due to changes in demand.

Many manufacturing systems are available in the market, such as IBM Corp.'s COPICS (Communications Oriented Porduction Information and Control System), that provide an inventory accounting module which provides the capability to analyze inventory costs of all items in the warehouse or storage locations. As indicated, this product, as well as other competing products, does not provide the capability to analyze work-in-process inventory costs due to changes in periodic demand.

What is needed is a system that addresses the issue of work-in-process inventory costs as a function of changes in customer demand. Such a system should be automated to calculate the costs and, using expert system techniques, provides the manufacturer with information that immediately establishes the impact of demand changes and recommends appropriate action. Expert systems are a branch of computer science, generally referred to as artificial intelligence, which exhibits characteristics normally associated with human behaviour including learning, reasoning, solving problems and so forth. More specifically, an expert system or "knowledge based" system uses certain rules and a database to provide a user interactive environment in the form of a "consultation dialog", just as the user would interact with a human expert.

SUMMARY OF THE INVENTION

It is therefore an object of this invention to provide an easy to use system that takes the planned demand data as required by customers for a given product and calculates the work-in-process inventory cost required to manufacture the product.

It is another object of the invention to provide an easy to use mechanism to evaluate the impact on raw material and work-in-process inventory due to changes in customer demand.

It is a further object of the invention to provide a system that prompts the user to alternate decision capabilities by a display of expected results for varying demand values.

The invention is a conceptual tool that uses existing bills of material generated, for example, by the automated bill of materials system described in copending application Ser. No. 07/100,395 together with process parameter data that describe the process steps and associated manufacturing cycle times developed, for example, in my copending application Ser. No. 07/127,334. The invention provides an easy to use, user friendly interface for the planning system to estimate inventory cost for a given product (raw material and work-in-process inventory) when customers place orders for an item. The real benefit of the invention is derived when customers request a change to the quantity for the items previously ordered. If the change is to increase the quantity ordered, the production planner can estimate the inventory cost required to execute the order, and if the change is to reduce the order, the planner can estimate the inventory cost for the item in the manufacturing process so that customers can be advised accordingly. This prior planning gives a measurement criteria for the planner to compare with the actual cost after the manufacturing is completed and enables the planning or operations manager to change or alter the manufacturing process so that actual costs are in line with the projected inventory costs.

According to the invention, the production planner upon receipt of customer demands by time period will first estimate the inventory required using a model. In response to the planner inputing values for demand values, the system automatically retrieves appropriate parameter values from a database and estimates the raw material and work-in-process inventory costs. The system also derives the inventory profile for manufacturing the product and provides a display in a graphical format. When new changes to the demand values are placed by the customer on command, the system recalculates the inventory values and gives the planner the impact statement based on the changes.

The process begins with the traditional planning process where the production planner receives all customer demand for the product and loads them in the planning database. This loading can be done either automatically through electronic transfer from an order entry system or the like. As new product manufacturing requirements are released from a development engineering organization, the planning system captures the bills of material data, routing data, manufacturing cycle time data and other parameters pertaining to the manufacturing process. Upon executing this system, the system generates the inventory profile for the product and a model to be followed based on the given parameter data from engineering. Based on the model, the system calculates cost values for varying demand data as specified by the customer. The inventory model is also used to establish control limits on inventory values that can be monitored against actual values incurred on the shop floor and corrective action taken from any deviations.

BRIEF DESCRIPTION OF THE DRAWINGS

The foregoing and other objects, aspects and advantages of the invention will be better understood from the following detailed description of a preferred embodiment of the invention with reference to the accompanying drawings, in which:

FIG. 3 is a tabular listing which is an extension of FIG. 2 illustrating the rate of build up of inventory values and providing a graphical profile of the inventory build up in order to manufacture the part;

FIG. 4 is a tabular listing of the summary of cost values associated with changes in demand for a given product;

FIG. 5 is a block diagram of the user and associated system interfaces from query system to the planning system and its relation to the database according to the invention;

DETAILED DESCRIPTION OF A PREFERRED EMBODIMENT OF THE INVENTION

Figures 1, 2:
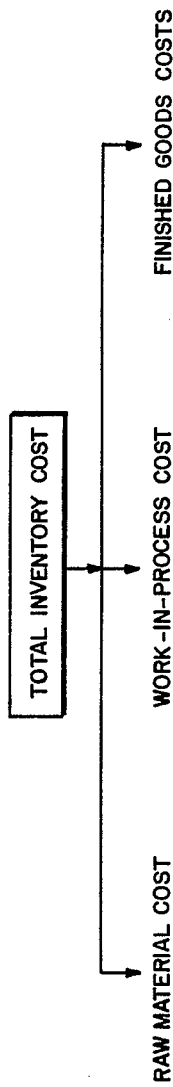
FIG. 1 is a diagram showing the three kinds of inventory costs associated with inventory of any given product.
FIG. 2 is a tabular listing illustrating a sample inventory data model for a part composed of five subcomponents.

Referring now to the drawings, and more particularly to FIG. 1, there is shown in high level context the break-down of total inventory costs into raw material cost, work-in-process cost and finished goods inventory cost. Raw material costs are those costs associated with the purchase of raw materials needed to manufacture a given products. This cost may be associated with any raw materials, be it raw components or semi-finished products, that are directly purchased from an outside vendor. Work-in-process inventory costs are those costs associated with storing semi-finished items in the manufacturing environments for which additional labor and overhead costs are added to the items after purchasing the raw components. Finished goods inventory costs are those costs for which all work is completed and are being stored in the warehouse. The sum total of all three costs is the total inventory cost associated with carrying inventory.

The first step involved in estimating required inventory, for both raw material and work-in-process inventory, is to model the appropriate inventory cost values required with respect to the time period. This process is the process of building an inventory model for a given finished product. The information pertaining to loading inventory cost values over a manufacturing cycle time for a finished product with its subassemblies is described below with reference to FIG. 2 and the associated inventory profile of cost values over the manufacturing cycle time of a given product together with precent and summary cost values are described below with reference to FIG. 3. Thus, FIG. 3 is a sample inventory model for a part number with subassemblies.

Referring first to FIG. 2, there is provided an example of a part, identified as part number (P/N) #1, that is composed of five subcomponents. These subcomponents may be subassemblies or individual items that go into making P/N #1. The data for the composition of P/N #1 may be obtained from an automated bill of materials program such as that disclosed in copending application Ser. No. 07/100,395. The time period 0—>12 is a sample time slice describing twelve clock cycles. It may be days or weeks or any time measure planned by the planner. It will be apparent from the figure that the completion time for P/N #1 is period "0", and period "12" is the earliest time that items can come to the plant for manufacturing the item. In the figure, assembly 1,1 is classified as the major subassembly that goes into P/N #1 after a unit of labor and overhead cost is added in period number 2 and a unit of labor and overhead cost is added in the final period prior to completion. The value 113 that is listed in period number 10 for assembly 1,3 is a hypothetical value of raw material cost needed for assembly 1,3, and the values 5, 10, 10, 16, 16 that are listed in weeks 7, 6, 5, 4, and 3 are the labor and overhead costs associated with manufacturing the assembly 1,3 in the respective time periods. This figure as described depicts the cost values in respective time periods that will be placed in order to manufacture the product. All these values are automatically derived from a planning database as relevant information is normally available when an item is planned for manufacture.

FIG. 2 illustrates the gradual progression of cost build up during the process of manufacturing the completed product. Cost required for the item in that respective week in order to assemble the product on time for feeding the higher assembly. Additional cost values entered on each row are the labor and overhead cost values added in the corresponding time period. This figure clearly illustrates how inventory costs get accumulated during the manufacturing process.

FIG. 3 is an extension of FIG. 2 and describes total material values, work-in-process values together with the total cost values for all subassemblies that make up P/N #1. The months of inventory for the model as illustrated at the bottom of the figure is basically the area under the graphical projection. Inventory turns expected are calculated by planned yearly output values for a given part, which is total units times standard cost, and dividing by the total of months of inventory times standard cost times average requirements as planned. In this extension of FIG. 2, the values are summed by respective columns of material cost category, labor and overhead cost cataegory. A graphical display of inventory profile buildup describes these values graphically. The months of inventory from the model is calculated by multiplying the appropriate total percent value of cost buildup by the corresponding week (or other specified time period) where items get built. The expected inventory turns from the model are calculated by first evaluating the total output (expected) on an annual basis, which is the total cost of goods shipped by the months of inventory as modeled converted into monthly inventory values. This graph depicts the expected raw material and work-in-process inventory cost expected on any product.

Any manufacturer would be willing to establish the inventory model for his respective product set. The total cost of inventory would obviously depend on the monthly or yearly demand values. FIG. 4 discribes the summary cost values by time period. Customers normally provide demand values in multiple periods as depicted by the "planned demand" values $X_1, X_2 \ldots$ The next row describes the revised demand values $Y_1, Y_2, \ldots$ which would be considered different from the planned demand values $X_1, X_2, \ldots$ In reality, not all demand values always change. Customers may normally change or request a change as they become more aware of their short term needs. When such a request is made, the manufacturer in question would like to execute this system and see the impact of the change which is described in the rows that follow. The material costs $M_1, M_2, \ldots$ refer to the material costs illustrated in FIG. 3. The values in FIG. 3 refer to per unit demand values. So, in order to evaluate the material cost values for $Y_1$ or $X_1$ units, the material cost values in FIG. 3 needs to be multiplied by that amount. The work-in-process values also need to be multiplied by the demand values. Work-in-process costs contain the material costs. $W_1'$, $W_2', \ldots$ are the work-in-process costs associated with revised demand values $Y_1, Y_2, \ldots$ The delta variation $(W_1' - W_1)$ is the difference in work-in-process costs associated with revised demand values $Y_1$ and $X_1$. If items have not been released to manufacturing, obviously, there may not be any finished goods values $F_1$ to account for, but if part of the demand $X_1$ has been fulfilled, $F_1$ values contribute to that amount available in inventory.

The system needs to be planned and designed in such a way that it is user friendly and the user just inputs the revised demand values $Y_1, Y_2, \ldots$ and the system automatically builds revised model values, compares these against planned cost figures and displays the total inventory impact. In FIG. 4, the total inventory impact T is computed as $T_1 = (W_1' - W_1) + F_1$, etc. This brings us to the need for developing a user friendly system.

FIG. 5 describes key parts of the system from the user point of view. The key parts are the database 10 and the query system 12. The database 10 can be any of several products currently available, but for purposes of this preferred embodiment, IBM Corp.'s DataBase 2 (DB2) is used. DB2 is a relational database management system, but it will be understood by those skilled in the art that other databases, including hierarchical databases, could be used. General information on IBM Corp.'s DB2 can be had with reference to publication GC26-4073-2 published by IBM Corp. The query system 12 can be an expert system, but for purposes of the preferred embodiment, IBM Corp.'s Restructured EXtended eXecutor (REXX) language is used. A description of the REXX language is provided in "Virtual Machine/Systems Product, System Product Interpreter User's Guide", Release 4, publication SC24-5238-2 published by IBM Corp.

The user 14 can query the current inventory values based on planned demand quantities and interrogate inventory raw material and work-in-process costs for varied demand values. The query system 12 interfaces with the Inventory Modeling system 16 and provides an inventory impact statement 18 for varied demand values. The database 10 has the capability to capture the projected inventory cost values obtained for varying demand values. The user 14 can access the results using the query facility 12 at a later date, if needed. This enhances the analysis capability of future test data and provides the needed enhancement.

Figure 6:
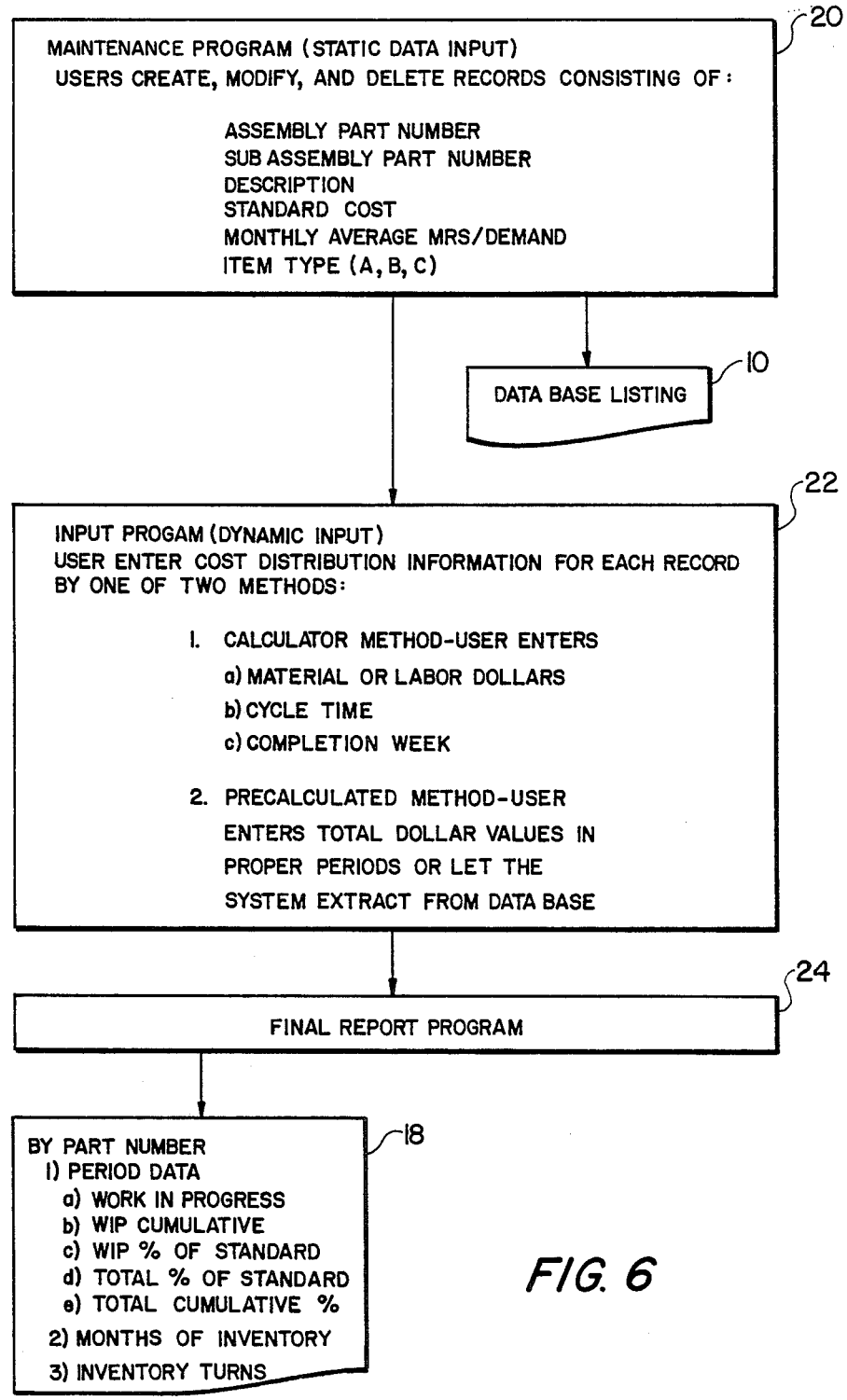
FIG. 6 is a block diagram illustrating the logical setup of the inventory model program according to the invention.

FIG. 6 describes the break out of the functional program necessary to provide an effective inventory model program. There are three basic programs in an inventory modeling system: (i) maintenance program 20, (ii) input program 22 and (iii) report generation program 24.

The maintenance program 20 is designed to maintain the input data in a specific format. For example, if a lead time to manufacture is changing, it may be desirable to provide capability to enter the new data without necessarily changing the old parameter data such as the part number or description. If the inventory model program is fully integrated with other planning systems such as COPICS, this maintenance program may not be necessary. However, for the sake of flexibility, it may be desirable to provide the capability to off-line systems.

The inventory model evaluation can be designed in such a way that the system gets all pertinent data automatically from a planning database such as the COPICS database and be fully integrated or provide the flexibility for the user to input the necessary information off-line so that the data can be manipulated or changed so that the model can be generated for varying values witout actually changing the planning database. In either case, the input program 22 provides the output such as shown in FIG. 2.

The report generation program 24 provides the capability to generate reports such as shown in FIGS. 2 and 3.

The maintenance program 20 provides the function of creating, modifiying and deleting records from the database 10. The records contain DA9-87-022 such parameter data as assembly part number, subassembly part numbers associated with the bill of material structure, description of the part numbers, standard cost information, average monthly demand and the item classification A, B or C. The A, B or C item classification is generally followed in the industry to separate those items that contribute significantly to the cost. "A" items are those items in a given set that contribute to 80% of the total cost. The "B" items are those items in the same set that contribute to 15% of the total cost. The "C" items are those items that belong to the same set as "A" or "B" items, that contribute to 5% of the total cost of the set. By segregating in this fashion, it would be very easy to control those key part numbers. First, the system develops the inventory model based on the parameter data as described in FIGS. 2 and 3 and then provides additional capability to enter demand values to calculate the inventory impact statements 18. The user can calculate the values iteratively by choosing different demand scenarios. The system prints an inventory model as well as impact reports on command. The detailed logic is provided in FIG. 7.

Figure 7:
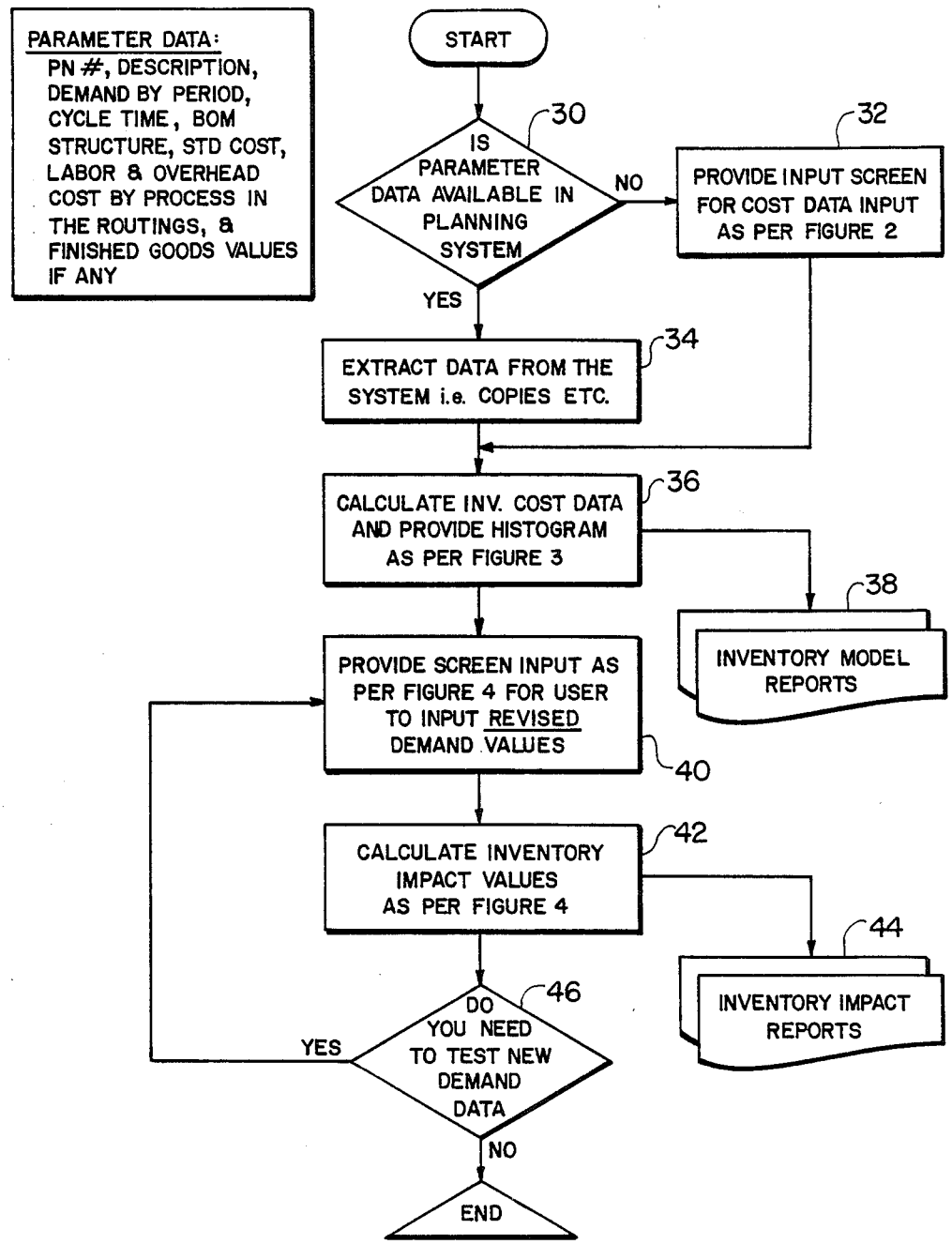
FIG. 7 is a flow chart illustrating the program logic for implementing the invention.

In FIG. 7, the process begins by testing in decision block 30 to determine whether there is parameter data available in the planning system. If not, the user is prompted in function block 32 to input cost data as in FIG. 2. If parameter data is available in the planning system, the data is extracted in function block 34. Once the data is either input manually or extracted, the inventory cost data is calculated and a histogram is generated as in FIG. 3, indicated in function block 36. That this point, inventory model reports 38 are output. Next, the user is provided with a screen as in FIG. 4 and the user is prompted in function block 40 to input revised demand values. The system then calculates in function block 42 inventory impact values as in FIG. 4 and provides inventory impact reports at 44. The user input is monitored in decision block 46 to determine if the user desires to test new demand data. If so, control returns to function block 40; otherwise, the process ends.

Customers normally change the demand values from time to time and would want a response from the manufacturer regarding commited delivery dates. The system according to the invention provides an easy to use mechanism to evaluate the impact on raw material and work-in-process inventory due to changes in the demand. Using this tool, any manufacturer can assess the inventory cost impact caused by demand fluctuations and take appropriate decisions regarding the price and delivery dates to be able to negotiate with the customer.

While the invention has been described in terms of a single preferred embodiment, those skilled in the art will recognize that the invention can be practiced with modification and alteration within the spirit and scope of the appended claims.

Having thus described my invention, what I claim as new and desire to secure by Letters Patent is as follows:

1. An automated method implemented on a computer for evaluating sensitivity of inventory cost to fluctuations in customer demand, said method providing an inventory cost analysis due to fluctuations in customer demand and comprising the steps of:

inputting planning parameter data describing inventory for a manufacturing process;

evaluating an inventory model of the manufacturing process based on said planning parameter data;

providing a data input screen for inputting revised demand values;

calculating inventory impact values for work-in-process inventory based on input revised demand values and the evaluation of said inventory model; and generating a report of said inventory impact values.

2. The automated method as recited in claim 1 wherein the step of inputting is performed by retrieving said planning parameter data from a database.

3. The automated method as recited in claim 1 wherein the step of inputting is performed by manually loading said planning parameter data.

4. The automated method as recited in claim 1 wherein said step of evaluating is performed by the steps of:

calculating inventory cost data over a period of time; and generating a histogram showing cumulative inventory costs over said period of time.

5. The automated method as recited in claim 4 further comprising the step of displaying said histogram.

6. The automated method as recited in claim 1 further comprising the step of determining if alternative new revised demand values are to be input, and if so, repeating said steps of providing a data input screen, calculating inventory impact values and generating a report of said inventory impact values.

* * * * *